(12) United States Patent
Kakeshita et al.

(10) Patent No.: US 12,415,509 B2
(45) Date of Patent: Sep. 16, 2025

(54) DRIVING SUPPORTING APPARATUS

(71) Applicant: TOYOTA JIDOSHA KABUSHIKI KAISHA, Toyota (JP)

(72) Inventors: Mafune Kakeshita, Toyota (JP); Xi Chen, Nagoya (JP); Tsunekazu Yasoshima, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 220 days.

(21) Appl. No.: 18/336,159

(22) Filed: Jun. 16, 2023

(65) Prior Publication Data

US 2023/0406296 A1 Dec. 21, 2023

(30) Foreign Application Priority Data

Jun. 20, 2022 (JP) .................................. 2022-098545

(51) Int. Cl.
*B60W 30/09* (2012.01)
*G06V 10/26* (2022.01)
*G06V 20/58* (2022.01)

(52) U.S. Cl.
CPC ............. *B60W 30/09* (2013.01); *G06V 10/26* (2022.01); *G06V 20/58* (2022.01);
(Continued)

(58) Field of Classification Search
CPC .. B60W 30/09; B60W 40/02; B60W 50/0098; B60W 2420/403;
(Continued)

(56) References Cited

U.S. PATENT DOCUMENTS 9,290,178 B2 * 3/2016 Sakima ................. B60W 30/08
9,540,038 B2 1/2017 Takashima
(Continued)

FOREIGN PATENT DOCUMENTS

CN 118082812 A * 5/2024 ........ B60W 30/0956
CN 118082817 A * 5/2024 ............ B60W 50/14
(Continued)

OTHER PUBLICATIONS

Yi Tan et al. "A Radar Guided Vision System for Vehicle Validation and Vehicle Motion Characterization", Intelligent Transportation Systems Conference, 2007. ITSC 2007, IEEE, PI, Sep. 1, 2007, pp. 1059-1066, XP031151499, ISBN: 978-1-4244-1395-9.

*Primary Examiner* — Atul Trivedi
(74) *Attorney, Agent, or Firm* — Dinsmore & Shohl LLP

(57) ABSTRACT

A driving supporting apparatus comprising a first sensor that detects an object present outside of a vehicle based on a reflection of a radio wave that the first sensor radiates, a second sensor that detects a boundary structural object positioned at a boundary between a road area on which the vehicle can travel and an area other than the road area, and a control unit configured to perform a pre-crash control to avoid a collision between the vehicle and a recognized object that is the object detected by the first sensor. The control unit is configured to make a possibility that the pre-crash control is performed when a far-side position condition to be satisfied when the recognized object is located at a far side of the boundary structural object with respect to the vehicle is satisfied lower than when the far-side position condition is not satisfied.

5 Claims, 7 Drawing Sheets

(52) U.S. Cl.
CPC . *B60W 2420/403* (2013.01); *B60W 2420/408* (2024.01); *B60W 2710/06* (2013.01); *B60W 2710/18* (2013.01)

(58) Field of Classification Search
CPC ....... B60W 2420/408; B60W 2710/06; B60W 2710/18; G06V 10/26; G06V 20/58; G01S 13/04; G01S 13/06; G01S 13/865; G01S 13/867; G01S 13/87; G01S 13/931; G01S 2013/93185; G01S 2013/9321; G01S 2013/93271; G01S 2013/93273
USPC .......................................................... 701/26
See application file for complete search history.

(56) References Cited

U.S. PATENT DOCUMENTS

| | | | |
|---|---|---|---|
| 9,610,950 | B2 | 4/2017 | Goto |
| 10,011,275 | B2* | 7/2018 | Ichikawa ............... G01S 7/5345 |
| 10,427,689 | B2 | 10/2019 | Tokimasa |
| 10,486,698 | B2 | 11/2019 | Masui |
| 10,583,737 | B2 | 3/2020 | Chiba |
| 10,723,349 | B2* | 7/2020 | Ozawa .................. B60W 50/14 |
| 10,793,147 | B2* | 10/2020 | Kaminade ............. B60Q 9/008 |
| 10,922,561 | B2 | 2/2021 | Ozawa |
| 11,072,328 | B2 | 7/2021 | Masui |
| 11,235,766 | B2 | 2/2022 | Masui |
| 11,247,671 | B2 | 2/2022 | Komori |
| 2005/0137786 | A1* | 6/2005 | Breed ............. B60W 30/18159 701/482 |
| 2005/0275514 | A1* | 12/2005 | Roberts .................... B60Q 5/00 340/436 |
| 2006/0274149 | A1* | 12/2006 | Yoshizawa ................ G01S 3/20 348/148 |
| 2014/0292502 | A1* | 10/2014 | Sakima ............... B60W 30/095 340/435 |
| 2017/0197616 | A1* | 7/2017 | Ichikawa ............... G01S 7/5345 |
| 2017/0294123 | A1* | 10/2017 | Baba .................... G05D 1/0255 |
| 2017/0309180 | A1* | 10/2017 | Baba ...................... G06V 20/58 |
| 2019/0084558 | A1* | 3/2019 | Kaminade ............ B60W 30/09 |
| 2020/0079427 | A1* | 3/2020 | Takahashi .............. G08G 1/167 |
| 2020/0226930 | A1* | 7/2020 | Shimbo .................. G06V 20/58 |
| 2020/0247398 | A1* | 8/2020 | Miyamoto .............. G01S 13/58 |
| 2021/0316723 | A1 | 10/2021 | Yamakawa |
| 2022/0101723 | A1* | 3/2022 | Bill ........................ G06V 10/82 |
| 2022/0135027 | A1* | 5/2022 | Bravi ...................... G06F 18/24 701/119 |
| 2023/0373530 | A1* | 11/2023 | Kume ...................... G08G 1/16 |
| 2023/0398994 | A1* | 12/2023 | Yamasaki ............. B60K 35/28 |
| 2023/0415737 | A1* | 12/2023 | Gaither ................. B60W 30/09 |
| 2024/0059285 | A1* | 2/2024 | Ng ........................ B60W 50/14 |
| 2024/0300534 | A1* | 9/2024 | Kobayashi ........ B60W 60/0015 |
| 2024/0344369 | A1* | 10/2024 | Perez Barrera ......... B60R 21/34 |

FOREIGN PATENT DOCUMENTS

| | | | | |
|---|---|---|---|---|
| EP | 3683112 | A1 | 7/2020 | |
| JP | H08-124080 | A | 5/1996 | |
| JP | 2001116839 | A | 4/2001 | |
| JP | 2019075015 | A * | 5/2019 | .......... G01S 13/588 |
| JP | 2022051230 | A * | 3/2022 | |
| JP | 2022060722 | A * | 4/2022 | ............ G01S 13/46 |
| WO | WO-2023179989 | A1 * | 9/2023 | ............ G08G 1/166 |

* cited by examiner

DRIVING SUPPORTING APPARATUS

CROSS REFERENCE TO RELATED APPLICATIONS

This application claims priority to Japanese Patent Application No. 2022-098545 filed on Jun. 20, 2022, which is incorporated herein by reference in its entirety.

TECHNICAL FIELD

The present disclosure relates to a driving supporting/assistance apparatus to prevent/avoid a collision with an object.

BACKGROUND

There has been a known driving supporting apparatus configured to perform a pre-crash control with respect to an object detected by a millimeter wave radar mounted on a vehicle. The millimeter wave radar is configured to detect an object by transmitting/radiating an electric wave (i.e., millimeter wave) having a wave length of 1 to 10 mm and by receiving the millimeter wave reflected by the object.

Such a sensor that detects an object utilizing a reflection of a radio wave (e.g., the electric wave) may erroneously detect the object at a position that is different from a true/actual position of the object, when the radio wave reflected by the object is further reflected by another object before the radio wave returns to the sensor.

The object whose position is erroneously detected is referred to as a "ghost". The object that causes the further (secondary) reflection (that creates the ghost) is often a structural object (i.e., boundary structural object) that is located at a boundary between a road area and an area other than the road area, such as a guardrail, a tunnel wall, and a noise barrier.

For example, a driving supporting apparatus (hereinafter, referred to as a "conventional apparatus") disclosed in Japanese Patent Application Laid-Open No. 2001-116839 is configured to:
 obtain an actual line that corresponds to the boundary structural object (e.g., a wall) based on a detection result of the millimeter wage radar;
 acquire a base line based on the thus obtained actual line; and
 determine that an object located outside of (at the far side of) the base line with respect to the vehicle is the ghost.

SUMMARY

The conventional apparatus detects both of the object and the actual line using a single millimeter wave radar. When the millimeter wave reflected by the object (hereinafter, referred to as an "object reflected wave") is further reflected by the boundary structural object, the millimeter wave radar recognizes a point (hereinafter, referred to as a "sub-reflection point") from which the object reflected wave is reflected by the boundary structural object, as the ghost.

The conventional apparatus obtains, as the actual line, a line along which a stationary object is continuously detected (refer to paragraph 0010 in the Japanese Patent Application Laid-Open No. 2001-116839). When the boundary structural object reflects the object reflected wave (i.e., when the sub-reflection is occurring), the conventional apparatus may not be able to detect the sub-reflection point of the boundary structural object as a part of the stationary object that is continuously detected. Consequently, the conventional apparatus cannot obtain the actual line, and thus, cannot determine whether or not the ghost is present.

The present disclosure is made to cope with the problem described above. That is, one of objectives of the present disclosure is to provide a driving supporting apparatus that can more accurately determine whether or not a ghost is present (exists) by improving an ability to detect/recognize the boundary structural object, so as to decrease a possibility of performing an unnecessary pre-crash control with respect to the ghost.

The driving supporting apparatus (hereinafter, referred to as a "present disclosure apparatus") according to the present disclosure comprises:
 a first sensor (22, 24L, 24R) that detects an object present outside of a vehicle based on a reflection of a radio wave that the first sensor radiates;
 a second sensor (26, 28L, 28R) that detects a boundary structural object positioned at a boundary between a road area on which the vehicle can travel and an area other than the road area; and
 a control unit (20, 30, 40, 50) configured to perform a pre-crash control to avoid a collision between the vehicle and a recognized object that is the object detected by the first sensor, the control unit being configured to make a possibility that the pre-crash control is performed when a far-side position condition is satisfied lower than when the far-side position condition is not satisfied, the far-side position condition being a condition to be satisfied when the recognized object is located at a far side of the boundary structural object with respect to the vehicle (step 435, step 615: Yes, step 625).

According to the present disclosure apparatus, the boundary structural object is detected by the second sensor that is different from the first sensor used for detecting the recognized object for which the pre-crash control is to be performed. Therefore, even when the first sensor has been detecting the ghost created due to the sub-reflection caused by the boundary structural object, the present disclosure apparatus can detect the boundary structural object without being affected by the detected ghost or the sub-reflection. Therefore, since a recognition accuracy of the boundary structural object can be enhanced, it is possible to accurately/correctly determine whether or not the far-side position condition is satisfied. Consequently, the present disclosure apparatus can reduce a possibility that the unnecessary pre-crash control is performed with respect to the ghost.

In some embodiments,
 the control unit is configured:
  to obtain a reliability degree (RD) representing a possibility that the recognized object is actually present based on a detected result of the first sensor (step 415, step 625);
  to subtract a predetermined subtraction value from the reliability degree of the recognized object that causes the far-side position condition to be satisfied (step 625);
  to perform the pre-crash control for the recognized object having the reliability degree that is equal to or greater than a predetermined threshold (step 435, step 445); and
  not to perform the pre-crash control for the recognized object having the reliability degree that is lower than the threshold (step 435).

According to the above embodiment, since the reliability degree of the recognized object that causes the far-side position condition to be satisfied is subtracted by the subtraction value, the possibility that the pre-crash control is performed when the far-side position condition is satisfied is made lower than when the far-side position condition is not satisfied. Consequently, the present disclosure apparatus can reduce the possibility that the unnecessary pre-crash control is performed with respect to the ghost.

In some embodiments, a type of the second sensor (26) is different from that of the first sensor (22, 24L, 24R).

Since the type of the second sensor is different from that of the first sensor according to the above embodiment, even when the first sensor has been detecting the ghost created due to the sub-reflection caused by the boundary structural object, the second sensor can more accurately detect the boundary structural object without being affected by the sub-reflection caused by the boundary structural object.

In the above embodiment,
the second sensor is a camera (26) that obtains a taken image by taking a picture of a scene outside of the vehicle; and
the control unit is configured to:
  specify the boundary, based on the taken image obtained at a present time point, by segmenting the scene into the road area and the area other than the road area (step 505, step 510);
  obtain, based on a plurality of the taken images obtained prior to the present time point, a depth and a height of an imaged object in the taken image obtained at the present time point (step 515); and
  specify/regards, as the boundary structural object, the imaged object, that is present within a predetermined area defined with respect to the boundary as a reference, whose depth is equal to or greater than a predetermined first threshold, and whose height is equal to or greater than a predetermined second threshold (step 525).

According to the above embodiment, the imaged object, whose depth is equal to or greater than the first threshold and whose height is equal to or greater than the second threshold, is specified/regarded as the boundary structural object. Thus, the boundary structural object can be more accurately detected.

In some embodiment,
the control unit is configured to:
  obtain an approximate line of the boundary structural object in a vehicle coordinate system having an origin positioned at a predetermined reference point of the vehicle (step 530); and
  determine whether or not the far-side position condition is satisfied, based on a relationship in the vehicle coordinate system between a position coordinate indicative of a position of the recognized object and the approximate line (step 615).

Accordingly, whether or not the recognized object is positioned at the far side of the boundary structural object with respect to the vehicle can be more accurately determined.

In some embodiment, the second sensor is disposed/arranged at a position different from a position at which the first sensor is disposed/arranged.

In a case where the second sensor and the first sensor are the same type of sensors and they are arranged at the same position as each other, when the second sensor detects a ghost, the second sensor may also detect the same ghost that the first sensor detects. However, as in the above embodiment, since the second sensor is arranged at a position different from the position at which the first sensor is arranged, the possibility described above can be reduced.

Notably, in the above description, in order to facilitate understanding of the present disclosure, the constituent elements or the like of the disclosure corresponding to those of the embodiments of the disclosure which will be described later are accompanied by parenthesized names and/or symbols which are used in the embodiments. However, the constituent elements of the disclosure should not be limited to those in the embodiments defined by the names and/or the symbols. Other objects, other features, and attendant advantages of the present disclosure will be readily appreciated from the following description of the embodiment of the disclosure which is made with reference to the accompanying drawings.

DETAILED DESCRIPTION

Figure 1:
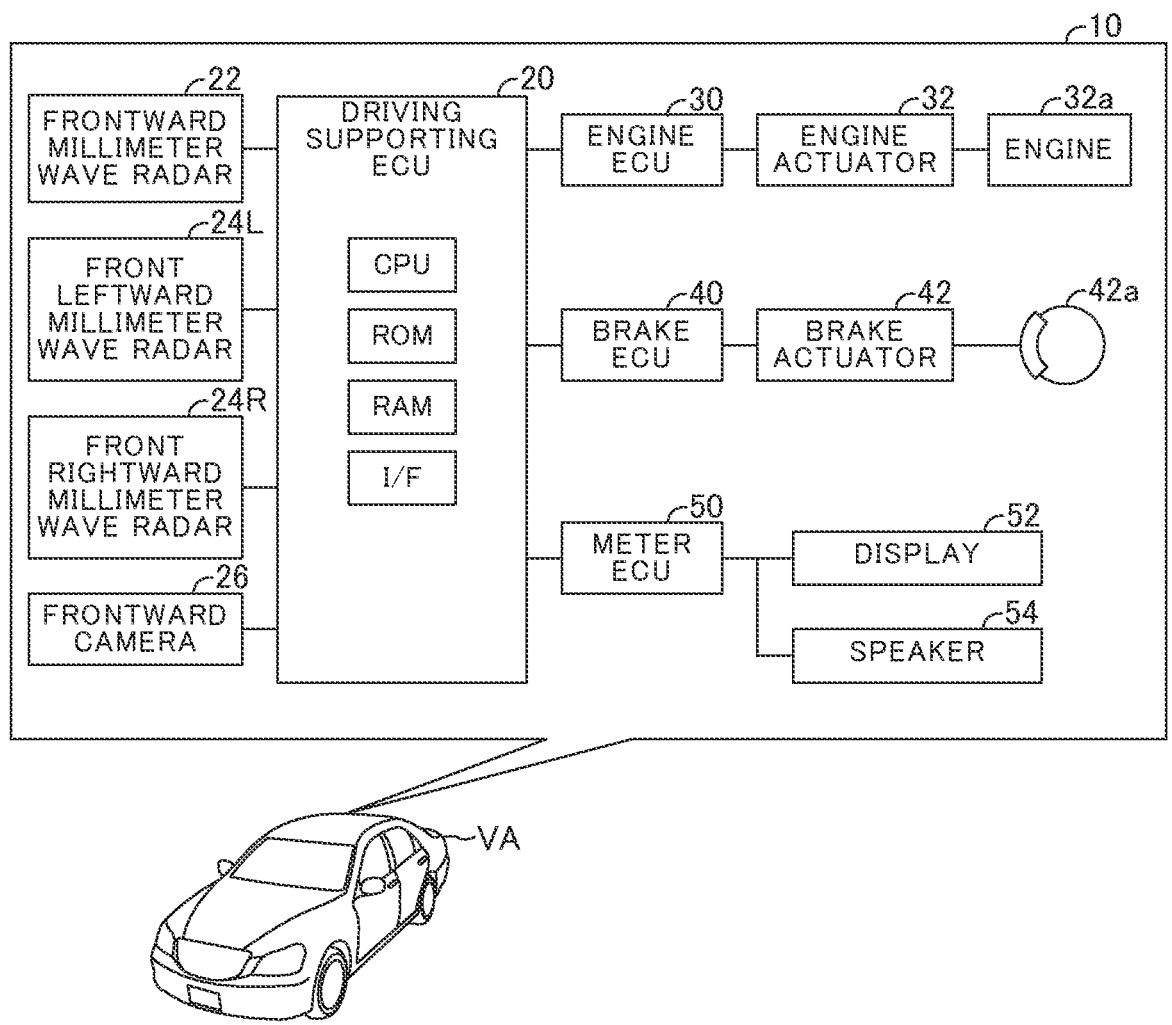
FIG. 1 is a schematic system diagram of a driving supporting apparatus according to an embodiment of the present disclosure.

A driving supporting/assistance apparatus (hereinafter, referred to as a "present supporting apparatus") according to an embodiment of the present disclosure is applied to (or installed in) a vehicle VA. As shown in FIG. 1, the present supporting apparatus 10 comprises a driving supporting ECU (hereinafter, referred to as a "DSECU") 20, an engine ECU 30, a brake ECU 40, and a meter ECU 50.

An "ECU" is an abbreviation of an "Electronic Control Unit" that is an electronic control circuit including a microcomputer as a main component. The microcomputer includes a CPU, a ROM, a RAM, and an interface (I/F). The ECU may sometimes be referred to as a "control unit", a "controller", or a "computer". The CPU is configured and/or programmed to realize various functions by executing instructions (routines/programs) stored in a memory (the ROM). Some or all of the above-described ECU 20, 30, 40, and 50 may be integrated into a single ECU.

The present supporting apparatus 10 comprises a frontward millimeter wave radar 22, a front leftward millimeter wave radar 24L, a front rightward millimeter wave radar 24R, and a frontward camera 26.

Hereinafter, when the frontward millimeter wave radar 22, the front leftward millimeter wave radar 24L, and the front rightward millimeter wave radar 24R need not be differentiated from each other, each of the radars is referred to as a "millimeter wave radar", or may sometimes be referred to as a "first sensor".

The millimeter wave radar detects an object by radiating (transmitting) a millimeter wave and receives a reflection wave of the radiated millimeter wave. The millimeter wave radar obtains/specifies a distance to the object, a lateral position of the object, and a relative speed of the object, and transmits object information including the distance, the lateral position, and the relative speed to the DSECU 20.

Figure 2:
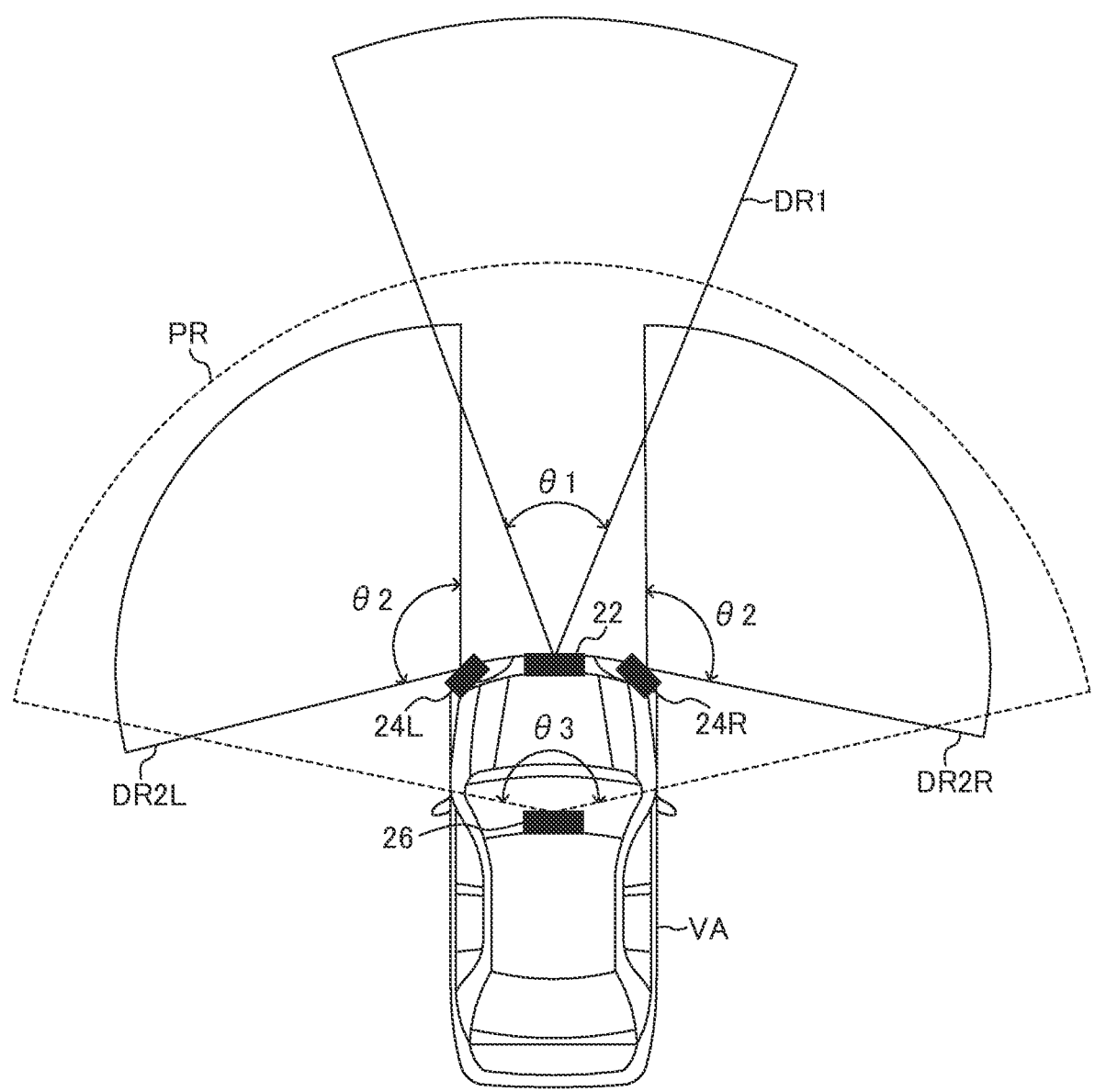
FIG. 2 is a drawing for describing disposed positions of each millimeter wave radar shown in FIG. 1 and a frontward camera shown in FIG. 1.

As shown in FIG. 2, the frontward millimeter wave radar 22 is arranged at a position in the vicinity of a center in a vehicle width direction of a front end of the vehicle VA. The frontward millimeter wave radar 22 receives the millimeter wave reflected by an object (3D object) located/positioned in a detection area DR1 in front of the vehicle VA so as to detect the object. The detection area DR1 is a sectoral area whose center extends frontward in a front-rear direction axis of the vehicle VA and whose center angle is θ1.

As shown in FIG. 2, the front leftward millimeter wave radar 24L is arranged at a left end in the vehicle width direction of the front end of the vehicle VA. The front leftward millimeter wave radar 24L detects an object located/positioned in a detection area DR2L. The detection area DR2L is a sectoral area whose center extends obliquely left frontward and whose center angle is θ2.

As shown in FIG. 2, the front rightward millimeter wave radar 24R is arranged at a right end in the vehicle width direction of the front end of the vehicle VA. The front rightward millimeter wave radar 24R detects an object located/positioned in a detection area DR2R. The detection area DR2R is a sectoral area whose center extends obliquely right frontward and whose center angle is θ2. It should be noted that the center angle of the detection area DR2L and the center angle of the detection area DR2R may be equal to each other or different from each other.

As shown in FIG. 2, the frontward camera 26 is arranged at an upper and in the vicinity of a central part in the vehicle width direction of a front windshield of the vehicle VA. The frontward camera 26 is disposed at the position different from the position of the millimeter wave radar. The frontward camera 26 obtains a taken image by taking a picture of an imaging area PR in front of the vehicle VA, and transmits the taken image to the DSECU 20. The imaging area PR is a sectoral area whose center extends frontward in the front-rear direction axis of the vehicle VA and whose center angle is θ3. The frontward camera 26 may sometimes be referred to as a "second sensor".

The engine ECU 30 is connected to an engine actuator 32. The engine actuator 32 includes a throttle valve actuator that varies a throttle valve opening degree of an engine 32a. The engine ECU 30 can change a torque generated by the engine 32a by driving the engine actuator 32. The torque generated by the engine 32a is transmitted to unillustrated drive wheels through an unillustrated transmission. It should be noted that the vehicle VA may comprise an electric motor in place of or in addition to the engine 32a.

The brake ECU 40 is connected to a brake actuator 42. The brake actuator 42 includes a hydraulic circuit that includes a master cylinder, fluid channels through which brake fluid flows, a plurality of valves, a pump, and a motor for driving the pump. The brake actuator 42 is configured to vary/adjust oil pressure of the brake fluid applied to wheel cylinders installed in a brake mechanism 42a, in response to an instruction from the brake ECU 40. The wheel cylinder is operated by the oil pressure to generate a frictional brake force to a wheel.

The meter ECU 50 is connected with a display 52 and a speaker 54. The display 52 is arranged at a position so as to face a driver in a driver's seat. For example, the display 52 is a multi information display. The speaker 54 is disposed inside a cabin of the vehicle VA and generates a buzzer sound.

(Outline of Operation)

The present supporting apparatus 10 obtains a time to collision that is a time required for a recognized object to collide with the vehicle VA or reach a position closest to the vehicle VA. The recognized object is an object that the present supporting apparatus 10 identifies/specifies based on the object information from the millimeter wave radars. The time to collision is expressed as "TTC", hereinafter.

When a TTC of a certain object is equal to or shorter than a threshold time Tth, the present supporting apparatus 10 performs a pre-crash control to prevent a collision between the vehicle and the object. The pre-crash control includes at least one of a "deceleration control to decelerate the vehicle VA" and an "alert (or warning) control to alert the driver of a likelihood of a collision".

As described above, the millimeter wave radar may detect a ghost, when "a millimeter wave reflected by an object (i.e., reflected wave)" is further reflected by another object. The reflection by the another object of the millimeter wave reflected by the object is referred to as a "sub-reflection". Especially, a guardrail, a wall of a tunnel, and a noise barrier are likely to cause the sub-reflection. Each of them is a structural object located/positioned between a road and an area other than the road, and hereinafter, is referred to as a "boundary structural object S".

The present supporting apparatus 10 continues determining, based on the taken image obtained by the frontward camera 26, whether or not the boundary structural object S is present. When (it is determined that) the boundary structural object S is present, the present supporting apparatus 10 determines whether or not a far-side position condition is satisfied. The far-side position condition is satisfied when the recognized object is located/positioned at the far side of (i.e. outside of) the boundary structural object S with respect to the vehicle VA.

Normally, the millimeter wave radar does not detect an actual object that is located at the far side of the boundary structural object S with respect to the vehicle VA. This is because, since the millimeter wave radiated by the millimeter radar is reflected by the boundary structural object S, the millimeter wave cannot reach the actual object located at the far side of the boundary structural object S. Therefore, the object that causes the far-side position condition to be satisfied is likely to be a ghost that is erroneously detected by the millimeter wave radar due to the sub-reflection caused by the boundary structural object S.

In view of the above, the present supporting apparatus 10 is configured to make a possibility of performing the pre-crash control for the object that causes the far-side position condition to be satisfied lower than a possibility of performing the pre-crash control for the object that does not cause the far-side position condition to be satisfied. In other words, the present supporting apparatus 10 is configured to change a possibility of performing the pre-crash control depending on whether or not the object causes the far-side position condition to be satisfied. Consequently, the present supporting apparatus 10 can reduce a possibility that the pre-crash control is performed for the ghost, and thus, can reduce a possibility that the driver has a feeling of strangeness regarding the performed pre-crash control.

In addition, the present supporting apparatus 10 determines whether or not the boundary structural object S is present, using the second sensor (i.e., the frontward camera) different from the first sensor (i.e., the millimeter wave radar) that is used to detect an object for which the pre-crash control is to be performed. This enables the present supporting apparatus 10 to detect the boundary structural object S accurately even when the first sensor detects the ghost due to the sub-reflection caused by the boundary structural object S, since the present supporting apparatus 10 determines whether or not the boundary structural object S is present based on the detection result of the second sensor.

(Example of Operation)

Figure 3:
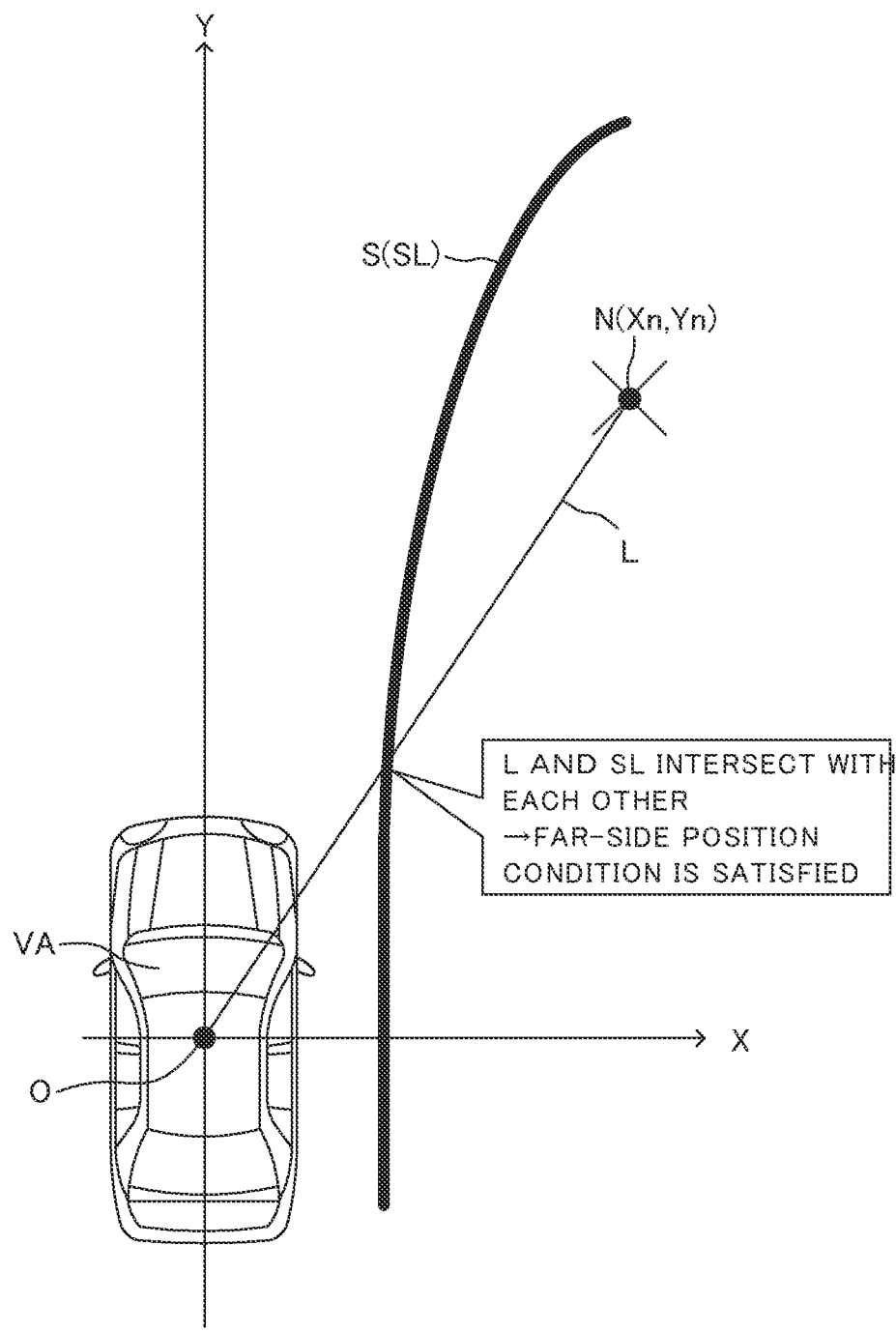
FIG. 3 is a drawing for describing an operation of the driving supporting apparatus according to the embodiment of the present disclosure.

With reference to FIG. 3, an example of operation of the present supporting apparatus 10 will next be described.

The present supporting apparatus 10 detects a recognized object N at a position (Xn, Yn) in a vehicle coordinate system (X, Y) having an origin O positioned at a predetermined reference point of the vehicle VA. The vehicle coordinate system (X, Y) has an X axis extending along the vehicle width direction of the vehicle VA, and a Y axis extending along the front-rear axis direction of the vehicle VA.

The present supporting apparatus 10 detects a boundary structural object S based on the taken image, and obtains an approximate line (curve) SL of the boundary structural object S, using, for example, a least squares method. Thereafter, the present supporting apparatus 10 determines whether or not a line segment L between the recognized object N and the origin O intersects with the approximate line SL. When the line segment L does not intersect with the approximate line SL, the present supporting apparatus 10 determines that the far-side position condition is unsatisfied. Whereas, when the line segment L intersects with the approximate line SL, the present supporting apparatus 10 determines that the far-side position condition is satisfied. In an example shown in FIG. 3, the present supporting apparatus 10 determines that the far-side position condition is satisfied with respect to the recognized object N, since the line segment L intersects with the approximate line SL.

The present supporting apparatus 10 subtracts a predetermined first subtraction value SV1 from a reliability degree RD of the recognized object N that causes the far-side position condition to be satisfied. The reliability degree RD is indicative of (or representing) a possibility (probability) that the recognized object N is actually present. The possibility that the recognized object N is actually present is higher as the reliability degree RD is higher.

The present supporting apparatus 10 adds a predetermined addition value AV to the reliability degree RD of the recognized object N, when a condition A1 described below is satisfied. Whereas, the present supporting apparatus 10 subtracts a predetermined second subtraction value SV2 from the reliability degree RD of the recognized object N, when a condition A2 described below is satisfied.

Condition A1: a condition that the present supporting apparatus 10 successively detects the same recognized object N predetermined times or more.

Condition A2: a condition that the present supporting apparatus 10 newly (suddenly/unexpectedly) detects a recognized object N that has not been detected.

The present supporting apparatus 10 obtains the TTC of (each of) the recognized object(s) N that has the reliability degree RD equal to or greater than a threshold RDth. More specifically, the present supporting apparatus 10 obtains the TTC by dividing the distance to the recognize object N by the relative speed of the recognized object N.

When a minimum TTC (the shortest TTC among the TTCs) is equal to or shorter than the threshold time Tth, the present supporting apparatus 10 performs the pre-crash control.

If the present supporting apparatus 10 performs the deceleration control as the pre-crash control, the present supporting apparatus 10 controls the engine actuator 32 in such a manner that the engine 32a does not generate a torque, and controls the brake actuator 42 in such a manner that the frictional brake force is applied to the wheel(s).

More specifically, the DSECU 20 transmits a deceleration instruction including information on a predetermined negative target acceleration to the engine ECU 30 and the brake ECU 40. Upon receiving the deceleration instruction, the engine ECU 30 controls the engine actuator 32 to fully close the throttle valve so that the engine 32a does not generate the torque. Upon receiving the deceleration instruction, the brake ECU 40 controls the brake actuator 42 in such a manner that the frictional brake force for letting an acceleration of the vehicle VA coincide with the target acceleration is applied to the wheels.

If the present supporting apparatus 10 performs the alert control as the pre-crash control, the present supporting apparatus 10 causes the display 52 to display an alert (warning) screen for notifying the driver of a likelihood of a collision, and causes the speaker 54 to generate the buzzer sound.

More specifically, the DSECU 20 transmits an alert instruction to the meter ECU 50. Upon receiving the alert instruction, the meter ECU 50 displays the alert screen on the display 52, and generates the buzzer sound from the speaker 54.

In this manner, the present supporting apparatus 10 lowers the reliability degree RD of the recognized object N that causes the far-side position condition to be satisfied, so as to make a possibility of performing the pre-crash control for the recognized object N that causes the far-side position condition to be satisfied lower than a possibility of performing the pre-crash control for the recognized object N that does not cause the far-side position condition to be satisfied. Consequently, the present supporting apparatus 10 can reduce a possibility that the pre-crash control is performed for the ghost.

(Specific Operation)
<Pre-Crash Control Routine>

The CPU of the DSECU 20 (hereinafter, the "CPU" means the CPU of the DSECU unless otherwise specified) is configured or programmed to execute a pre-crash control routine shown by a flowchart in FIG. 4 every time a predetermined time elapses.

Figure 4:
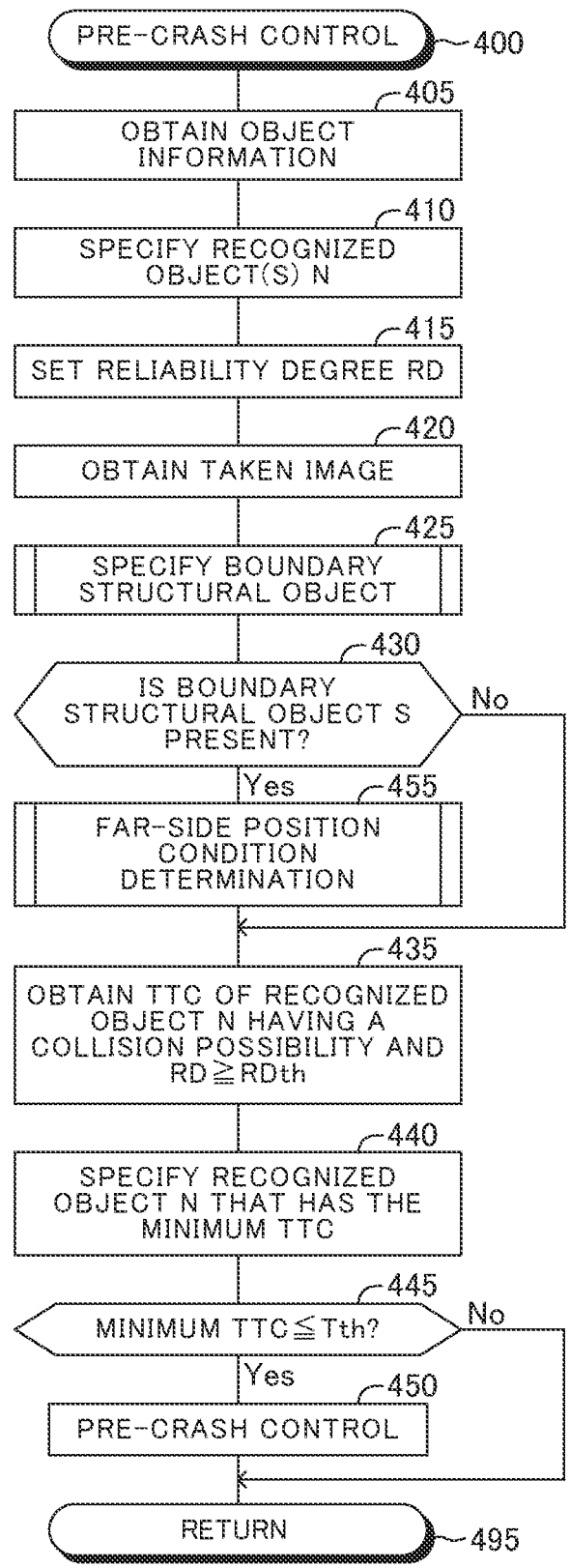
FIG. 4 is a flowchart illustrating a pre-crash control routine executed by a CPU of a driving supporting ECU shown in FIG. 1.

When an appropriate time point comes, the CPU starts processing from step 400 in FIG. 4, and sequentially executes the processes of step 405 to step 430.

Step 405: the CPU obtains the object information from the millimeter wave radars.

Step 410: the CPU identifies/specifies the recognized object(s) N based on the object information.

More specifically, the CPU specifies (obtains), based on the object information, a position coordinate (Xn, Yn) indicative of a position of each recognized object N in the vehicle coordinate system (X, Y). Furthermore, when the recognized object is firstly detected, the CPU sets the reliability degree RD of the recognized object N to an initial value IV at step 410.

Step 415: the CPU sets the reliability degree RD of each of the above-described recognized object(s) N.

More specifically, the CPU determines (with respect to each of the above-described recognized objects N) whether or not the above-described condition A1 is satisfied, and determines whether or not the above-described condition A2 is satisfied. The CPU adds the addition value AV to the reliability degree RD of the recognized object N, when the condition A1 is satisfied. The CPU subtracts the second subtraction value SV2 from the reliability degree RD of the recognized object N, when the condition A2 is satisfied.

Step 420: the CPU obtains the taken image from the frontward camera 26.

Step 425: the CPU executes a boundary structural object specifying subroutine for specifying the boundary structural object S based on the taken image. The boundary structural object specifying subroutine will be described later with reference to FIG. 5.

Step 430: the CPU determines whether or not the boundary structural object S is present.

When the boundary structural object S is not present, the CPU makes a "No" determination at step 430, and sequentially executes processes of step 435 to step 445.

Step 435: the CPU obtains TTC of the recognized object N, whose reliability degree RD is equal to or greater than the threshold RDth and which has a collision likelihood (collision possibility). Whether or not an object has the collision likelihood will be described later.

For example, the threshold RDth, the initial value IV, the addition value AV, the first subtraction value SV1, the second subtraction value SV2 may have been set at respective values, in such a manner that the reliability degree RD of when the far-side position condition is satisfied is smaller than the threshold RDth.

As one example, they are as follows.
threshold RDth: 35
initial value IV: 50
addition value AV: 10
first subtraction value SV1: 30
second subtraction value SV2: 10

Alternatively, the threshold RDth, the initial value IV, the addition value AV, the first subtraction value SV1, the second subtraction value SV2 may have been set at respective values, in such a manner that the reliability degree RD does not become smaller than the threshold RDth when only the far-side position condition is satisfied, but becomes smaller than the threshold RDth when both the far-side position condition and the condition A2 are satisfied.

The CPU determines that the recognized object N has the collision likelihood (collision possibility) when the recognized object N will collide with the vehicle VA or will enter/reach an area within a predetermined distance from a body of the vehicle VA, in a case both the vehicle VA and the recognized object N move while they maintain respective current speeds and respective moving directions.

The CPU specifies the moving direction of the vehicle VA based on a vehicle speed that is a speed of the vehicle VA and a steering angle of the vehicle VA. The vehicle speed is measured using an unillustrated vehicle speed sensor, and the steering angle is measured using an unillustrated steering angle sensor.

The CPU specifies the moving direction of the recognized object N based on a record (history) of the detected position (Xn, Yn) of the recognized object N.

Step 440: the CPU specifies/identifies the recognized object N that has the minimum TTC (among the recognized objects N if there are two or more of the recognized objects N).

Step 445: the CPU determines whether or not the minimum TTC is equal to or smaller than the threshold time Tth.

When the minimum TTC is greater than the threshold time Tth, the CPU makes a "No" determination at step 445, and directly proceeds to step 495 to terminate the present routine tentatively.

Whereas, the minimum TTC is equal to or smaller than the threshold time Tth, the CPU makes a "Yes" determination at step 445, and proceeds to step 450. At step 450, the CPU performs the pre-crash control, and proceeds to step 495 to terminate the present routine tentatively.

If the boundary structural object S is present when the CPU proceeds to step 430, the CPU makes a "Yes" determination at step 430, and proceeds to step 455. At step 455, the CPU executes a far-side position condition determination subroutine for determining whether or not the far-side position condition is satisfied, and thereafter, executes the processes of steps following step 435. It should be noted that the far-side position condition determination subroutine will be described later with reference to FIG. 6.

At step 435 of the present routine, the CPU does not obtain the TTC of the recognized object N that has the reliability degree RD smaller than the threshold RDth. Therefore, the pre-crash control is not performed for the recognized object N that has the reliability degree RD smaller than the threshold RDth.

<Boundary Structural Object Specifying Subroutine>

Figure 5:
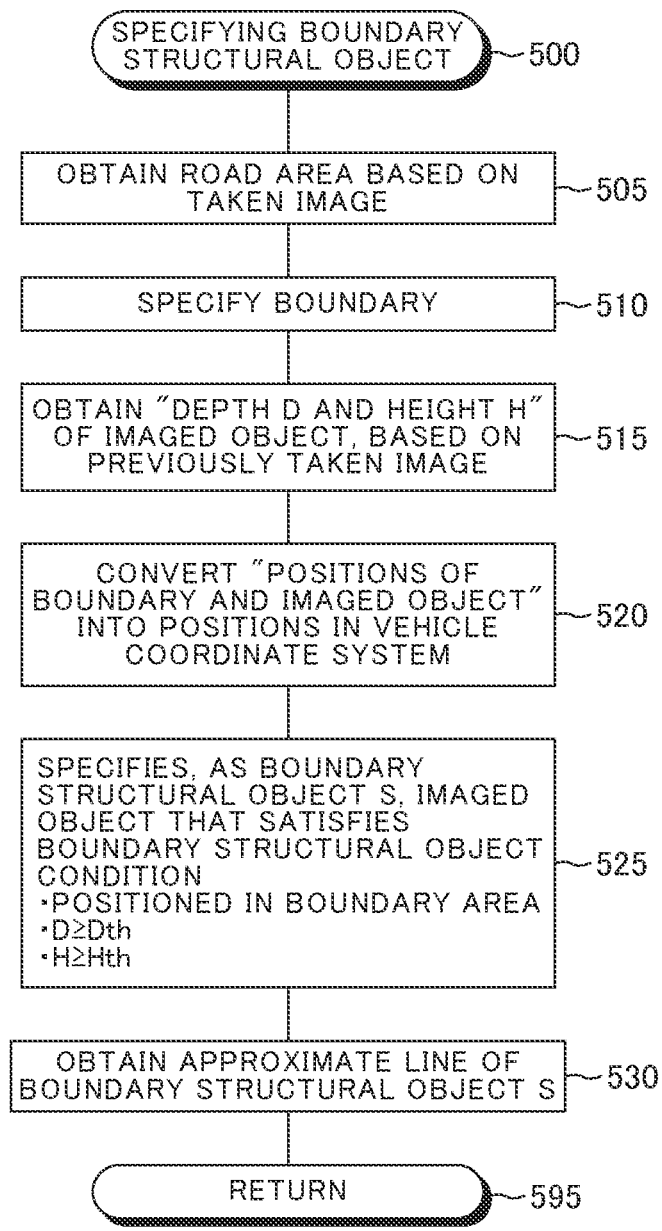
FIG. 5 is a flowchart illustrating a boundary structural object specifying subroutine executed by the CPU of the driving supporting ECU shown in FIG. 1.

When the CPU proceeds to step 425 shown in FIG. 4, the CPU executes the boundary structural object specifying subroutine shown by a flowchart in FIG. 5. Namely, when the CPU proceeds to step 425, the CPU starts processing from step 500 shown in FIG. 5, and sequentially executes the processes of step 505 to step 530.

Step 505: the CPU obtains a road area that is an area on which the vehicle VA can travel, based on the taken image. For example, the CPU can divide/segment the taken image into the road area and an area other than the road area, utilizing SS (Semantic Segmentation).

Step 510: the CPU specifies, in the taken image, a boundary between the road area and the area other than the road area.

Step 515: the CPU obtains "a depth D and a height H" of an object (i.e., an imaged object) that is taken/imaged in the "currently taken image" that is the taken image obtained at step 420 shown in FIG. 4, based on a plurality of taken images obtained prior to the currently taken image. The plurality of the taken images have been taken from different viewpoints, and therefore, the depth D and the height H of the imaged object can be obtained based on the plurality of taken images. For example, the CPU can obtain the depth D and the height H of the imaged object utilizing SfM (Structure from Motion).

Step 520: the CPU converts "positions of the boundary and the imaged object" in the taken image into positions in the vehicle coordinate system (X, Y).

Step 525: the CPU specifies/regards the imaged object that satisfies all of the following structural object conditions B1 to B3 as the boundary structural object S.

Condition B1: the imaged object is located/positioned in a boundary (belt-like) area having a predetermined width with respect to the boundary as a reference.

Condition B2: the depth D of the imaged object is equal to or greater than a depth threshold Dth.

Condition B3: the height H of the imaged object is equal to or greater than a height threshold Hth.

Step 530: the CPU obtains the approximate line (curve) SL of the boundary structural object S.

It should be noted that, if the boundary structural object S is not specified because there is no imaged object that satisfies all of the structural object conditions B1 to B3, the CPU does not obtain the approximate line (curve) SL at step 530.

Thereafter, the CPU proceeds to step 595 to terminate the present routine tentatively, and proceeds to step 430 shown in FIG. 4.

<Far-Side Position Condition Determination Subroutine>

Figure 6:
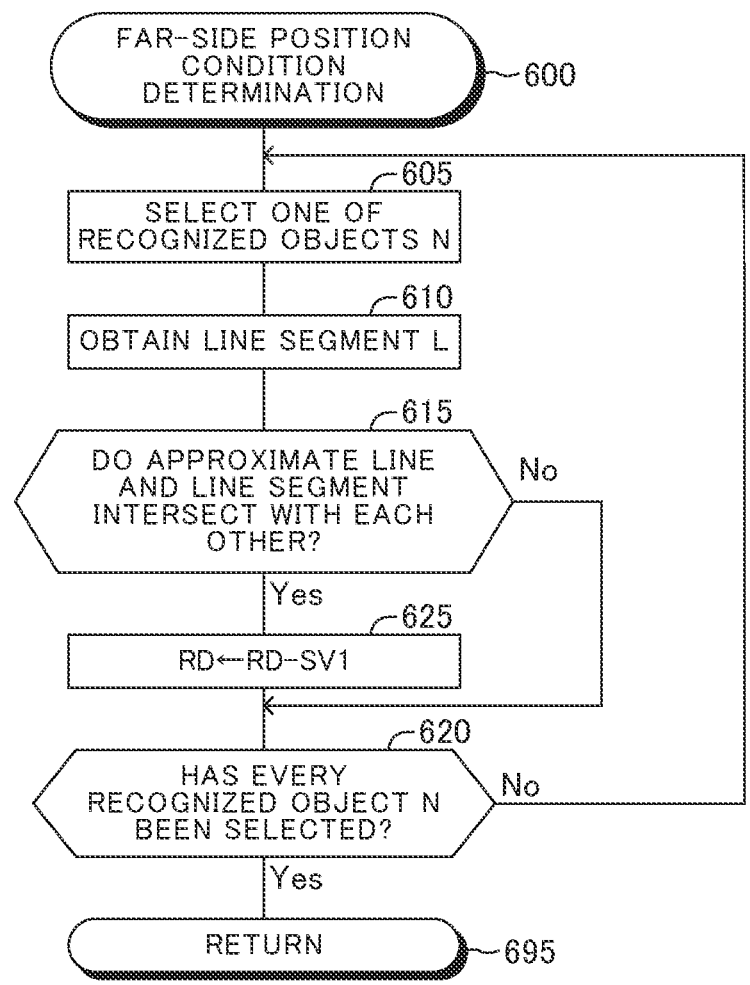
FIG. 6 is a flowchart illustrating a far-side position condition determination subroutine executed by the CPU of the driving supporting ECU shown in FIG. 1.

When the CPU proceeds to step 455 shown in FIG. 4, the CPU executes the far-side position condition determination subroutine shown by a flowchart in FIG. 6. Namely, when the CPU proceeds to step 455, the CPU starts processing from step 600 shown in FIG. 6, and sequentially executes the processes of step 605 to step 615.

Step 605: the CPU selects "one of the recognized objects N" to which specific processes described below should be carried out. Hereinafter, the recognized object N that is selected at step 605 is referred to as a "processing object N".

Step 610: the CPU obtains the line segment L connecting the (position of the) processing object N with the origin of the vehicle coordinate system (X, Y).

Step 615: the CPU determines whether or not the approximate line SL of the boundary structural object S and the line segment L intersect with each other.

When the approximate line SL of the boundary structural object S and the line segment L do not intersect with each other (in other words, when the far-side position condition is not satisfied), the CPU makes a "No" determination at step 615, and directly proceeds to step 620. At step 620, the CPU determines whether or not every recognized object N has been selected as the processing object N.

When every recognized object N has not been selected as the processing object N yet, the CPU makes a "No" determination at step 620, and returns to step 605 so as to select one of the recognizes objects N that have not been selected as the processing object N. Thereafter, the CPU proceeds to step 610.

When the approximate line SL of the boundary structural object S and the line segment L intersect with each other (in other words, when the far-side position condition is satisfied), the CPU makes a "Yes" determination at step 615, and proceeds to step 625. At step 625, the CPU subtracts the first subtraction value SV1 form the reliability degree RD of the processing object N, and proceeds to step 620.

Whereas, if all of the recognized objects N have been selected as the processing objects, the CPU makes a "Yes" determination at step 620, proceeds to step 695 to terminate the present routine tentatively, and proceeds to step 435 shown in FIG. 4.

The present supporting apparatus 10 according to the embodiment described above detects the boundary structural object S using the second sensor (i.e, the frontward camera 26) that is different from the first sensor (i.e., the millimeter wave radar(s)) used for detecting the recognized object N. Therefore, even when the first sensor has been detecting the ghost created due to the sub-reflection caused by the boundary structural object S, the present supporting apparatus 10 can certainly detect the boundary structural object S without being affected by the detected ghost or the sub-reflection. Consequently, a case where it is not possible to determine whether or not far-side position condition is satisfied since the boundary structural object S is unable to be specified can be avoided/prevented. Thus, the present supporting apparatus 10 is able to specify the ghost more accurately so as to reduce a possibility that the pre-crash control is performed with respect to the ghost.

The present disclosure should not be limited to the above-described embodiment, and may employ various modifications within the scope of the present disclosure.

(First Modification)

The first sensor is not limited to the millimeter wave radar. The first sensor may be any sensor that detects an object using a reflection of a radio wave that the sensor radiates.

(Second Modification)

The second sensor is not limited to the camera. For example, the second sensor may be the same type of the sensor as the first sensor Namely, the second sensor may be the millimeter wave sensor. When the second sensor is the millimeter wave sensor, the CPU specifies/regards an object whose length is equal to or longer than a length threshold Lth as the boundary structural object S.

Figure 7:
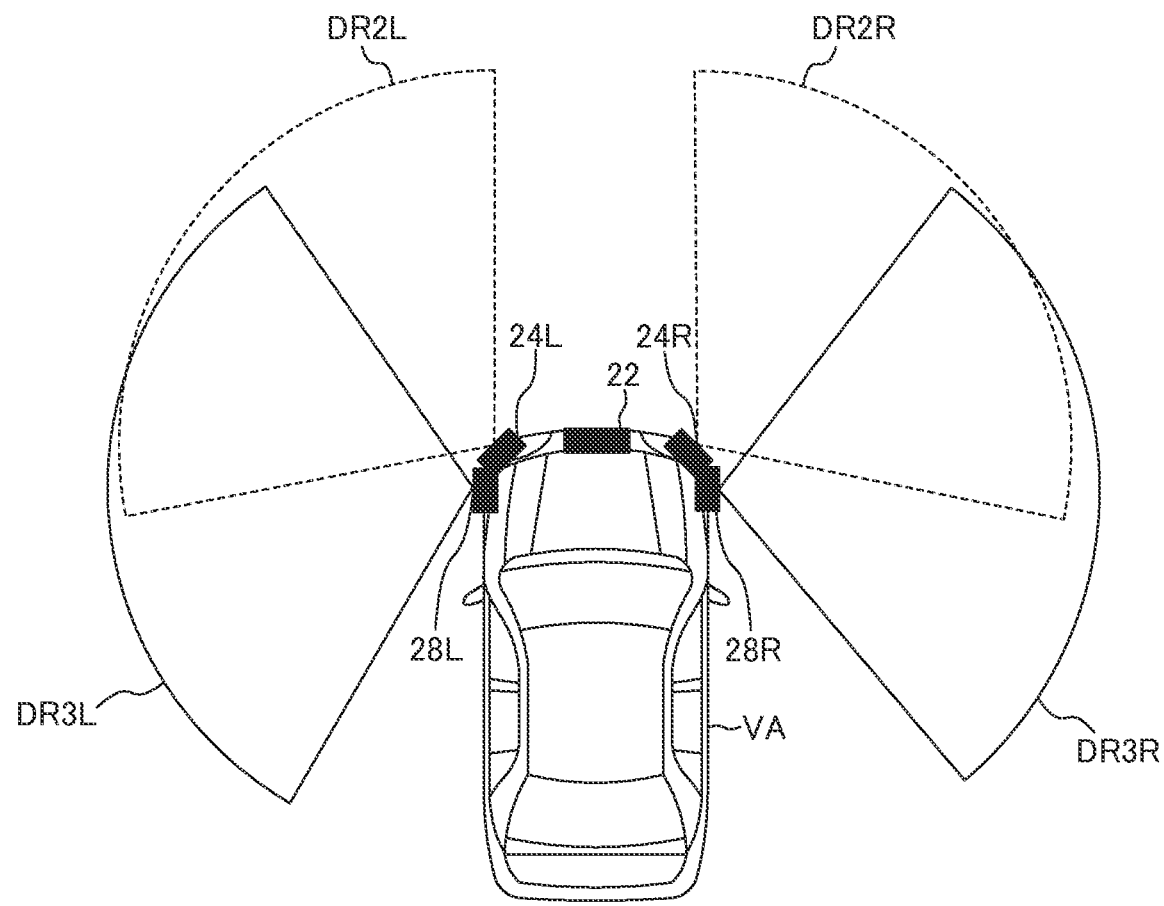
FIG. 7 is a drawing for describing disposed positions of a leftward millimeter wave radar and a rightward millimeter wave radar in a second modification of the embodiment of the present disclosure.

As shown in FIG. 7, the present supporting apparatus 10 may comprise, as the second sensor, a leftward millimeter wave radar 28L and a rightward millimeter wave radar 28R, in place of the frontward camera 26.

As shown in FIG. 7, the leftward millimeter wave radar 28L is arranged at a left side of the vehicle VA, and detects an object located/positioned in a detection area DR3L. The detection area DR3L is a sectoral area whose center extends leftward in the vehicle width direction of the vehicle VA.

As shown in FIG. 7, the rightward millimeter wave radar 28R is arranged at a right side of the vehicle VA, and detects an object located/positioned in a detection area DR3R. The detection area DR3R is a sectoral area whose center extends rightward in the vehicle width direction of the vehicle VA.

When the leftward millimeter wave radar 28L and the front leftward millimeter wave radar 24L are arranged at the same position as each other, and when the front leftward millimeter wave radar 24L detects a ghost, a possibility that the leftward millimeter wave radar 28L also detects the same ghost is high. However, as shown in FIG. 7, the leftward millimeter wave radar 28L is arranged at a position different from the position at which the front leftward millimeter wave radar 24L is arranged. Therefore, the possibility that the leftward millimeter wave radar 28L detects the ghost that the front leftward millimeter wave radar 24L detects can be reduced.

For the same reason, the rightward millimeter wave radar 28R is arranged at a position different from the position at which the front rightward millimeter wave radar 24R is arranged.

(Third modification)

The present supporting apparatus 10 may be applied not only to the above-described vehicle with the internal combustion engine, but also to a hybrid electric vehicle (HEV), a plug-in hybrid electric vehicle (PHEV), a fuel cell electric vehicle (FCEV), and a battery electric vehicle (BEV). The present supporting apparatus 10 can also be applied to an autonomous control vehicle.

What is claimed is:

1. A driving supporting apparatus comprising:
    a first sensor that detects an object present outside of a vehicle based on a reflection of a radio wave that said first sensor radiates;
    a second sensor that detects a boundary structural object positioned at a boundary between a road area on which said vehicle can travel and an area other than said road area; and
    a control unit configured to perform a pre-crash control to avoid a collision between said vehicle and a recognized object that is said object detected by said first sensor, said control unit being configured to make a probability that said pre-crash control is performed when a far-side position condition is satisfied lower than when said far-side position condition is not satisfied, said far-side position condition being a condition to be satisfied when said recognized object is located at a far side of said boundary structural object with respect to said vehicle, wherein, said control unit is configured:
  to obtain a reliability degree representing a probability that said recognized object is actually present based on a detected result of said first sensor;
  to subtract a predetermined subtraction value from said reliability degree of said recognized object that causes said far-side position condition to be satisfied;
  to perform said pre-crash control for said recognized object having said reliability degree that is equal to or greater than a predetermined threshold; and
  not to perform said pre-crash control for said recognized object having said reliability degree that is lower than said threshold.

2. The driving supporting apparatus according to claim 1, wherein,
a type of said second sensor is different from that of said first sensor.

3. The driving supporting apparatus according to claim 2, wherein,
said second sensor is a camera that obtains a taken image by taking a picture of a scene outside of said vehicle; and
said control unit is configured to:
  specify said boundary, based on said taken image obtained at a present time point, by segmenting said scene into said road area and said area other than said road area;
  obtain, based on a plurality of said taken images obtained prior to said present time point, a depth and a height of an imaged object in said taken image obtained at said present time point; and
  specify, as said boundary structural object, said imaged object, that is present within a predetermined area defined with respect to said boundary as a reference, whose depth is equal to or greater than a predetermined first threshold, and whose height is equal to or greater than a predetermined second threshold.

4. The driving supporting apparatus according to claim 1, wherein,
said control unit is configured to:
  obtain an approximate line of said boundary structural object in a vehicle coordinate system having an origin positioned at a predetermined reference point of said vehicle; and
  determine whether or not said far-side position condition is satisfied, based on a relationship in said vehicle coordinate system between a position coordinate indicative of a position of said recognized object and said approximate line.

5. The driving supporting apparatus according to claim 1, wherein,
said second sensor is disposed at a position different from a position at which said first sensor is disposed.

* * * * *